(Specimens.)

E. D. LIBBEY.
GLASSWARE.

No. 343,823. Patented June 15, 1886.

Witnesses.

Inventor.
Edward D. Libbey
by Crosby & Gregory
attys.

UNITED STATES PATENT OFFICE.

EDWARD D. LIBBEY, OF WINCHESTER, MASSACHUSETTS.

GLASSWARE.

SPECIFICATION forming part of Letters Patent No. 343,823, dated June 15, 1886.

Application filed January 18, 1886. Serial No. 188,948. (Specimens.)

*To all whom it may concern:*

Be it known that I, EDWARD D. LIBBEY, of Winchester, county of Middlesex, and State of Massachusetts, have invented an Improvement in Glassware, of which the following description, in connection with the accompanying drawings, is a specification, like letters on the drawings representing like parts.

This invention has for its object the production of a novel and beautiful article of glassware; and it consists, essentially, in an article of glassware wherein a glass mixture of one color is plated with a ruby-glass mixture containing gold, the ruby-glass plating having color developed in only portions of it, thus giving to the article a blended-color effect, substantially as will be described.

Figure 1:
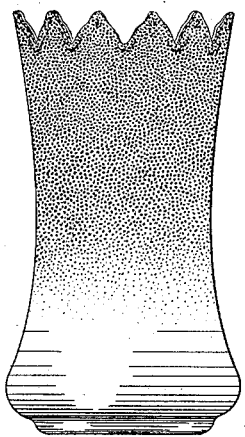
Figure 2:
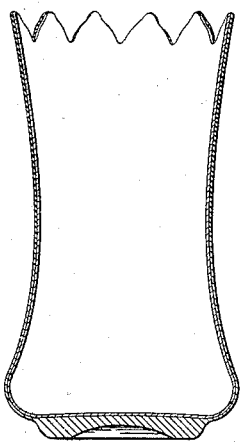

Figure 1 represents a vase embodying my invention, and Fig. 2 a vertical section thereof.

My invention may be carried out practically by gathering on an iron in usual manner an opal or opalescent glass and then gathering thereon, as a covering, a ruby glass containing the metal gold, and from the two kinds of glass so gathered the article to be made is blown and shaped in usual manner. The article, having been shaped, is then reheated at parts where it is desired to develop a darker color than at other parts, as in the manufacture of what is known as "amberina glass," and as described in United States Patent No. 282,002, dated July 24, 1883. An article of glassware composed of an opal or opalescent glass plated with a gold-ruby mixture and reheated to develop at portions thereof a deeper color, which blends into the lighter part of the glass not sufficiently reheated to develop the color, presents a very beautiful and desirable appearance, and this appearance will be varied and the color effects attained and exhibited will or may be made to depend upon the color of the glass upon which the ruby-glass mixture containing gold is plated. For instance, the glass so plated may be what is known as "white glass," or it may be glass of canary color, or blue, or green, or of other usual color, and the red color which would appear as developed in the ruby-glass mixture containing gold will be modified by the color of the glass upon which it is plated, and the resultant color apparent to the eye being substantially that which would appear in mixing or blending lighter colors into one.

I have herein referred to an article of glassware as blown; but it is obvious that the same effect may be had and that my invention may be practiced in connection with glassware which is pressed.

I desire it to be understood that I may, if desired, add to the ruby-glass mixture cobalt, which would give to the part of the plating not reheated, as herein provided for, a blue color; and so if uranium were used the part of the plating not reheated would be yellow. The addition of other oxides and coloring materials would produce other colors.

I claim—

As an improved article of manufacture, glassware composed of glass of one color plated with a ruby glass containing gold, the ruby-glass plating having color developed in only portions of it, thus giving to the article so produced a blended-color effect, substantially as described.

In testimony whereof I have signed my name to this specification in the presence of two subscribing witnesses.

EDWARD D. LIBBEY.

Witnesses:
G. W. GREGORY,
C. M. CONE.